United States Patent
Bennett et al.

[15] 3,665,560
[45] May 30, 1972

[54] PLASTIC STRING FASTENER HAVING DETACHABLE PARTS

[72] Inventors: John L. Bennett, Dayton, Ohio; Charles P. Bonfiglio, Rochester, N.Y.

[73] Assignee: General Motors Corporation, Detroit, Mich.

[22] Filed: Dec. 9, 1970

[21] Appl. No.: 96,487

[52] U.S. Cl. ..........................................24/136 R, 24/115 G
[51] Int. Cl. ..............................................F16g 11/04
[58] Field of Search .............24/126 R, 126 K, 126 L, 115 R, 24/115 G, 136 R, 136 L; 242/125.2; 339/247

[56] References Cited

UNITED STATES PATENTS

| | | | |
|---|---|---|---|
| 2,997,522 | 8/1961 | Schneider | 24/136 R |
| 3,103,725 | 9/1963 | Robb et al. | 24/136 R |
| 3,279,014 | 10/1966 | Fischer | 24/115 R |
| 3,540,637 | 11/1970 | Ezell | 24/126 K |
| 3,611,510 | 10/1971 | Bennett et al. | 24/126 R |

*Primary Examiner*—Bobby R. Gay
*Assistant Examiner*—Darrell Marquette
*Attorney*—E. W. Christen, C. R. Meland and Richard G. Stahr

[57] ABSTRACT

In a preferred form, a string fastener made of a plastic molded material has two detachable and mutually interlocking parts for securing the end strands of a string. A base forming one of the parts includes a center opening. The other part forms a key having a stem connected in axial alignment with the center opening by a frangible membrane which is broken when the stem is inserted into the center opening. A tongue extending from the stem is guided into clamping engagement with the end strands along the center opening whereupon the base and the key are mutually interlocked.

4 Claims, 9 Drawing Figures

PATENTED MAY 30 1972 3,665,560

INVENTORS
John L. Bennett, &
BY Charles P. Bonfiglio
Robert W. Smith
ATTORNEY

3,665,560

PLASTIC STRING FASTENER HAVING DETACHABLE PARTS

BACKGROUND OF THE INVENTION

This invention relates to the securing and clamping of the end strands of string or light cords used in binding and lacing applications and more particularly to a plastic string fastener having two detachable parts for clamping the end strands of a lacing string used for binding wire bundles and end turns of wire wound windings of dynamoelectric machines.

Strings and lightweight cords are often used in automated manufacturing processes for binding wire cabling bundles or the end turns of the stator windings of small dynamoelectric machines. In one such example, lacing cord is threaded to the end turns of a stator winding by a lacing machine as described in U.S. Pat. No. 2,580,871, Wirtz, issued Jan. 1, 1952, and assigned to the assignee of this invention. After the lacing string is applied, the stator is removed from the lacing machine and the loose end strands of the lacing string are manually tied together by knots. Such manual steps are often troublesome, time consuming, and add substantial cost to manufacturing processes which are otherwise principally performed by machines.

Accordingly, it is desirable to have an inexpensive string fastener which is quickly and easily applied to tie or clamp the end strands of a lacing string threaded around or through wire bundles. Many of prior string fasteners include two mating parts in which there is considerable time and difficulty in manipulating and orienting the parts onto the end strands. Further time and effort is also required in applying one of the parts to the other. This has prevented the general use of string fasteners since the time and manipulative skill is greater than that required for manually tied knots.

SUMMARY OF THE INVENTION

In accordance with the present invention, a string fastener made of a molded plastic material has two detachable parts. A base forms one of the parts and includes a center opening defining a noncircular section and a coextensive slot section. The other part forms a key having a stem nonrotatably insertable into the noncircular section. The stem supports a tongue extending from one side of the stem and insertable into said slot section. The key is detachably connected in axial registration with the center opening by a frangible membrane which is broken when the key is inserted into the center opening. The noncircular section axially guides the stem to insert the tongue for clamping the end strands along the slot section and to interlock the key and base in fixed clamping relationship with the end strands.

It is an important feature of this invention that the string fastener is adaptable for use in automatic machines of a type resembling remotely actuated stapling apparatus. The string fastener is easily fed to such apparatus by automatic orienting and conveying equipment so as to substantially reduce or eliminate the manual steps required to clamp or tie the loose end strands of a string.

It is an object of this invention to provide an improved plastic string fastener that is formed by two detachable and interlocking parts which are interconnected by a frangible membrane so as to be held in mutual alignment until the fastener is simply applied over the loose end strands of a string and in which the end strands are quickly clamped together when one of the parts is inserted into a complementary shaped opening formed in the other part by breaking the frangible membrane.

A further object of this invention is to provide an inexpensive string fastener made of a moldable plastic material including a base having a center opening and key having a stem detachably connected to the base in axial alignment with the center opening by a frangible membrane and further having a tongue extending above the base opening so as to define a lateral slot space for initially receiving the string end strands that are to be clamped together, wherein the frangible membrane is broken when said stem is inserted into the center opening and upon further insertion the tongue clamps the end strands in the center opening.

And a still further object of this invention is to provide a plastic string fastener including a base having a center opening and a key having a stem carrying a tongue on one side and connecting the key to the base in axial alignment with the center opening along a frangible membrane for simple and quick clamping of the end strands of a lacing string used in binding the end turn conductors of a dynamoelectric machine, in which the center opening defines a noncircular section for nonrotatably receiving the stem and a coextensive slot section for receiving the tongue in clamping engagement with the end strands, and further in which the key is interlocked with the base along said center opening when the end strands are clamped therein and lugs on the side of the stem restrain axial removal of said key from said center opening.

Further objects and advantages of this invention will become apparent from the following description, reference being had to the accompanying drawing wherein a preferred embodiment of the present invention is illustrated.

DESCRIPTION OF THE PREFERRED EMBODIMENT

Figure 1:
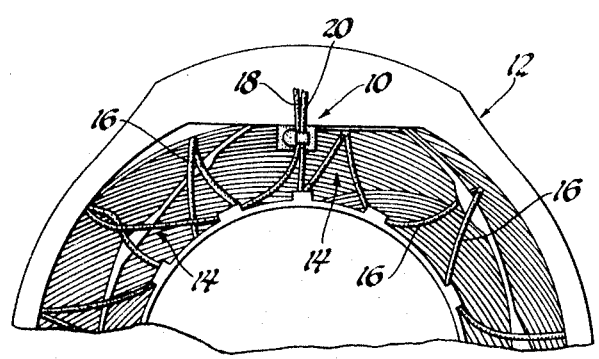
FIG. 1 illustrates an end view of the stator of a dynamoelectric machine including the plastic string fastener of this invention for clamping the end strands of a lacing string threaded to the end turn conductors of the stator winding.

Referring now to the drawing wherein the same numeral is used in the several Figures to designate the same or like parts, and more particularly to FIG. 1, the plastic string fastener 10 of this invention is illustrated on a stator 12 of a dynamoelectric machine which may include an electric induction motor of the type used in household applicances. These induction motors include a stator winding formed by bundles of wire conductors carried in the stator and including winding end turns 14 extending from the stator ends. The winding end turns 14 and terminal lead wires of the stator winding are bound together by a lacing string 16. A pair of loose end strands 18 and 20 of the lacing string 16 are clamped together by the string fastener 10. This holds the lacing string 16 taut so as to bind the winding end turn conductors and the terminal lead wires in place. It is necessary that the conductors of the winding end turns are held tightly together to reduce noise, vibrations and abrasion of the conductor insulation which is caused by excessive vibrations.

The lacing string 16 is formed by flexible strands of an elongated fibrous material. The lacing cord 16 may be threaded through the winding end turns 14 by lacing machines of the type disclosed in the aforementioned U.S. Pat. No. 2,580,871 and known to those skilled in the art of making wire wound stator and rotor assemblies for dynamoelectric machines. Following threading of the lacing string 16 to the winding end turns 14, a pair of end strands 18 and 20 are left loose and the stator 12 is removed from a lacing machine. The lacing string 16 is then tightened by pulling the pair of end strands 18 and 20 taut so that the lacing string 16 and the winding end turns 14 are drawn into a compacted integral assemblage. The pair of end strands 18 and 20 are clamped together by the plastic string fastener 10 of this invention, as described in detail hereinbelow, so that the winding end turns 14 are substantially rigidly bound.

Figure 9:
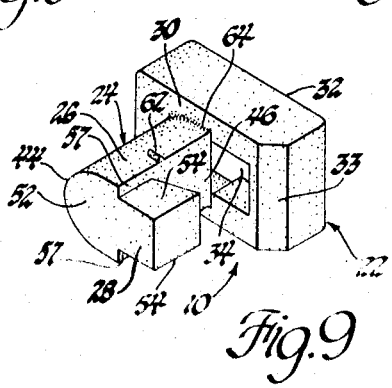
FIG. 9 illustrates a perspective view of the plastic string fastener made in accordance with the present invention.

The plastic string fastener 10 is illustrated in FIGS. 2 through 5 and in the perspective view of FIG. 9 as it is formed in a molding process prior to being applied to the end strands 18 and 20 of the lacing cord 16. The plastic string fastener 10 is preferably made of a nylon type moldable plastic material having high strength and resilience characteristics and being capable of withstanding wide ambient temperature ranges under which the stator 12 is used.

Referring now more particularly to details of the plastic string fastener 10 illustrated in FIGS. 2, 3, 4 and 5, the fastener includes two detachable and interlocking parts formed by a base 22 and a key 24 formed by a stem 26 and a tongue 28 extending from the stem. The base 22 has a thin rectangular box shape with flat parallel top and bottom surfaces 30 and 32. The top and bottom surfaces 30 and 32 are oriented horizontally in the drawing for purposes of describing this invention. Further, for purposes of this description, the right-hand end of the plastic string fastener 10 as viewed in FIGS. 2, 3, 4 and 7 is taken as the front end and, correspondingly, the left-hand end as the rear end. The front end of the top surface 30 is beveled slightly as indicated by the numeral 33.

Figure 4:
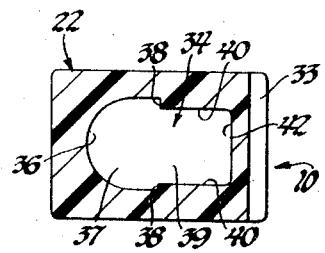
FIG. 4 illustrates a cross-sectional view taken along the line 4—4 in FIG. 2 and looking in the direction of the arrows.

A generally keyhole shaped elongated hole forms a center opening 34 in the base 22 as illustrated in the cross-sectional view of FIG. 4. The sides of the base opening 34 extend perpendicularly through the base top and surfaces 30 and 32 and form an arcuate sidewall 36 which is generally U-shaped. A pair of oppositely spaced and substantially coplanar recessed sidewalls 38 extend inwardly from the open ends of the arcuate sidewall 36. The sidewalls 36 and 38 define a noncircular section 37 in the rearward area of the center opening 34. The noncircular configuration provided by the arcuate sidewall 36 and the pair of recessed sidewalls 38 prevents rotation of the stem 26 when it is axially inserted into the center opening 34, as described further hereinbelow.

The forward area of the center opening 34 defines a slot section 39 formed by a pair of flat substantially parallel sidewalls 40 extending from the inner ends of the pair of recessed sidewalls 38 and terminating at a flat end wall 42. Thus, the slot section 39 has a rectangular shape and is coextensive with noncircular section 37 to axially receive the tongue 28 in a manner described hereinafter.

Figure 2:
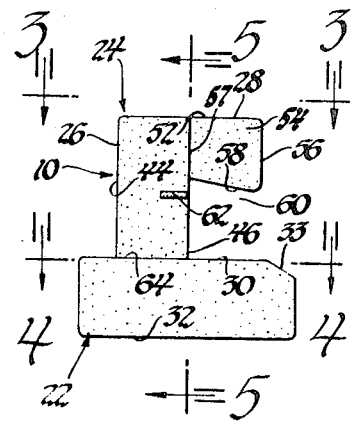
FIG. 2 illustrates a side elevational view of the plastic string fastener illustrated in FIG. 1.
Figure 3:
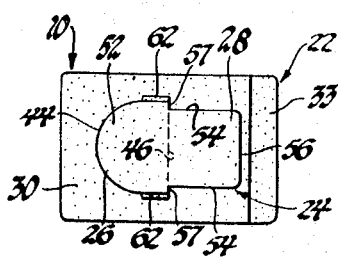
FIG. 3 is a top plan view taken along the line 3—3 in FIG. 2 and looking in the direction of the arrows.
Figure 5:
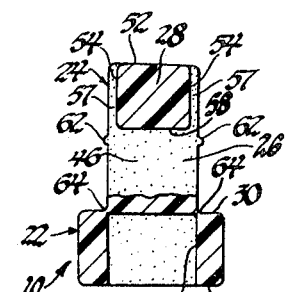
FIG. 5 illustrates a cross-sectional front end view taken along line 5—5 in FIG. 2 and looking in the direction of the arrows.

The key 24, as illustrated in FIGS. 2 and 5, extends axially above the noncircular section 37. The stem 26 has a horizontal cross-sectional size and configuration complementary to the size and configuration of the noncircular section 37. Accordingly, the stem 26 includes a generally U-shaped rear side 44, as illustrated in FIG. 3, terminating in a substantially flat front side 46. The stem 26 is slidingly insertable along the arcuate sidewall 36 and the pair of recessed sidewalls 38.

The outer end of the stem 26 carries the tongue 28 extending laterally from the stem front side 46. A substantially flat outer surface 52 of the key 24 forms the outer terminal areas of the tongue 28 and stem 26. A pair of straight, parallel sides 54 of the tongue 28 extend downward from the outer surface 52 and laterally between the stem front side 46 and a flat tongue end 56. The horizontal cross section of the tongue 28 has a complementary rectangular shape and size to that of the slot section 39. Accordingly, the pair of tongue parallel sides 54 and the tongue end 56 have a sliding fit with the pair of parallel sidewalls 40 and the end wall 42 of the center opening 34. Also, the lateral cross section of key 24 is identical to the center opening 34 as indicated by the shape of key outer surface 52. A pair of spaced shoulders 57 are formed in the outer areas of stem front side 46 adjacent the pair of tongue parallel sides 54. The pair of shoulders 57 correspond to the pair of recessed sidewalls 38 and are slidably insertable along the pair of recessed sidewalls 38 to permit insertion of the tongue 28 into the slot section 39.

The bottom 58 of the tongue 28, as illustrated in FIG. 2, is tapered downwardly from the stem front side 46 to the tongue end 56. This defines a hook-like projection between the tongue 28 and the stem front side 46. The height of the tongue end 56 is approximately equal to the height between the base top and bottom surfaces 30 and 32.

The tongue bottom 58 is spaced above the base top surface 30 and over the base opening 34 so as to define a lateral slot opening 60. The end strands 18 and 20, prior to being clamped, are positioned in the lateral slot 60. The beveled surface 33 aids entry of the end strands 18 and 20 when they are laid parallel to the stem front side 46 and across center opening 34.

Figure 8:
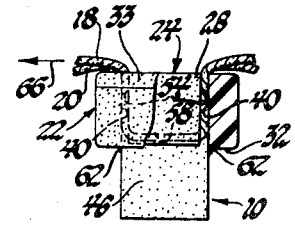
FIG. 8 illustrates a front end view, partially in section, taken along lines 8—8 in FIG. 7 and looking in the direction of the arrows.

The stem rear side 44 includes a pair of oppositely disposed lugs 62. The pair of lugs 62 are formed by small protrusions extending horizontally for short distances along the forward areas of the stem rear side 44. The pair of lugs 62 are located axially approximately in the middle of the stem 26. The distance from the inner end of the stem is such that the distance from the outer surface 52 is equal to the height of the base 22. They are resiliently yieldable against the arcuate sidewall 36 when the stem 22 is inserted into the noncircular section 37. When the outer surface 52 of the key 24 is flush with the base top surface 30, the pair of lugs 62 are released from a resiliently compressed state and spring outward to overlap the base bottom surface 32, as shown in FIG. 8. Thus, the pair of lugs 62 form stops to prevent upward removal of the key 24 from the center opening 34.

A frangible membrane 64, a cross-sectioned view being illustrated in FIG. 5, detachably connects the key 24 to the base 22. The frangible membrane 64 is molded integrally between the top edge of the arcuate sidewall 36 and the inner end of the rear stem side 44. The stem 26 and the base 22 are held together such that the stem rear side 44 and the pair of tongue parallel sides 54 are in axial registration with the arcuate sidewall 36 and the pair of parallel sidewalls 40, respectively. Accordingly, the stem 26 is connected in axial registration with noncircular section 37 and is immediately adjacent so as to cover the top area of center opening 34. This also holds the tongue 28 in a spaced and axially registering orientation with the slot section 39.

The thickness of the frangible membranes 64 is approximately 0.005 to 0.010 inch to provide sufficient strength so that the key 24 and base 22 are not separated during handling while being breakable when the stem 26 is inserted into the center opening 34. The frangible membrane 64, in the preferred embodiment, extends along the opposite sides of the stem rear side 44 and terminates toward the center of the stem rear side 44 so that a small gap is formed in the membrane. As a matter of choice, the frangible membrane 64 may be continuous.

To assemble the string fastener 10 of this invention to the pair of end strands 18 and 20 to be clamped, the strands of the lacing string 16 are pulled taut and the end strands 18 and 20 are inserted into the lateral slot 60. Accordingly, the end strands 18 and 20 are positioned transversely across the slot section 39 of the center opening 34 and are rested on the base top surface 30.

The string fastener 10 can be held between the jaws of a pliers-like tool, or alternatively, a series of the string fasteners 10 can be aligned and fed through a guide channel of a stapler type of apparatus having an operating mechanism including a bottom support plate for receiving the base 22 and a plunger or ram axially aligned with the stem 26. Such a plunger can be remotely actuated for pressing against the key 24 so that the frangible membrane 64 is broken and the key 24 is inserted into the center opening 34.

When pressure is applied across the outer surface 52 of the key 24 and the base bottom surface 32 so that the frangible membrane 64 is broken, the stem rear side 44 and front side 46, being axially aligned with the noncircular section 37, are slidingly inserted along the arcuate sidewall 36 and the pair of recessed sidewalls 38. This guides the stem 26 axially and nonrotationally to maintain the tongue 28 in registration with the slot section 39. The stem 26 and tongue 28 are prevented from rotating or lateral displacement by the noncircular sidewalls 36 and 38 defining the noncircular section 37. This maintains the pair of tongue parallel sides 54 and the tongue end 56 in axial registration with the pair of parallel sidewalls 40 and the end wall 42. The pair of lugs 62 are resiliently compressed as they are pressed past the arcuate sidewall 36.

Figure 6:
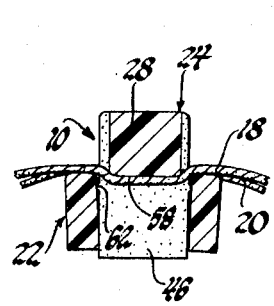
FIG. 6 illustrates a cross-sectional front end view of the plastic string fastener of this invention when the fastener parts are in an intermediate clamping position for securing the end strands of a string.

As illustrated in FIG. 6, the tongue bottom 58 initially engages the pair of end strands 18 and 20 and begins bending them into a U-shaped loop configuration as the tongue 28 begins clamping the pair of end strands 18 and 20 to the base 22. The taper of the tongue bottom 58 confines the pair of end strands 18 and 20 within the lateral slot 60 and provides a camming action that forces the pair of end strands 18 and 20 rearwardly and against the stem front side 46.

Figure 7:
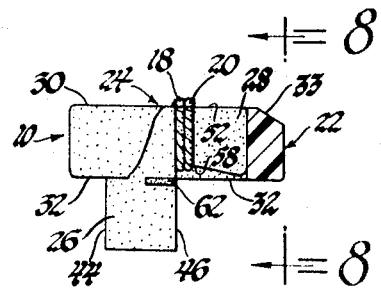
FIG. 7 illustrates a side elevational view, partially in section, showing the string fastener parts moved from the positions indicated in FIG. 6 to a finally assembled clamping position.

The stem 26 is further inserted into the center opening 34 until the outer surface 52 is substantially flush with the base top surface 30, as shown in FIGS. 7 and 8. At this time, the pair of lugs 62 are released from their compressed condition and resiliently spring outward so as to overlap the base bottom surface 32, as also illustrated in FIGS. 7 and 8.

In the final string clamping position of the string fastener 10, the pair of end strands 18 and 20 have the U-shaped configuration shown in FIG. 8 and are compressed or pinched between the opposing clamping surfaces formed by the pair of tongue parallel sides 54 and the pair of parallel sidewalls 40 of the slot section 39. The pair of end strands 18 and 20 are resiliently clamped by these opposing clamping surfaces, and are further clamped by the opposite corners formed between the tongue bottom 58 and the pair of tongue parallel sides 54.

A lateral force, indicated by arrow 66 in FIG. 8, developed by the taut forces in the lacing string 16 are directed along the axis of the pair of end strands 18 and 20 at the junction of the end strands and the remaining or binding part of the lacing string 16. This tends to pull the end strands causing upward force against the tongue bottom 58. The pair of lugs 62 prevent the key 22 from being forced upward from the base 22. With the pair of end strands 18 and 20 being clamped together, the key 24 and the base 22 are held in clamping and interlocking engagement within the center opening 34 to maintain the lacing string 16 taut so that the winding end turns 14 are held in a tightly bound condition.

The plastic string fastener 10 made in accordance with description hereinabove provides a simple shape and configuration permitting mass production using an inexpensive plastic material by known molding techniques. With high volume production the string fastener 10 is produced at a very nominal cost. Further, the string fastener 10 is simply applied over a pair of end strands and quickly clamps the end strands by the two mating parts being detached when the key 24 is inserted in the center opening 34. The two parts are maintained in the desired aligned orientation for clamping the end strands 18 and 20 within the opening 34 so as to facilitate the use of the plastic string fastener 10 in feeding and press apparatus for machine application of the fastener parts on string end strands to be clamped.

While the embodiment of the present invention as described hereinabove constitutes a preferred embodiment it is to be understood that other forms may be adopted in accordance with the novel features set forth hereinabove.

What is claimed is:

1. A plastic string fastener having two detachable and mutually interlocking parts for securing the end strands of a string, comprising: a base; an opening extending through said base, said opening having a noncircular section and a slot section; and a key having a stem nonrotationally insertable into said noncircular section and connected in axially aligned relationship with said opening by a frangible membrane with said frangible membrane being breakable during insertion of said key into said opening, said key further having a tongue extending laterally from said stem and being insertable into said slot section for initially clamping said end strands between said tongue and said base, and upon further insertion clamping said end strands along said slot section and interlocking said base and said key.

2. A string fastener made of a molded plastic material and having two detachable and mutually interlocking parts for securing the end strands of a string, said string fastener comprising: a base having an opening extending therethrough, said opening having a noncircular section terminated by a slot section; a key including a stem slidingly insertable into said noncircular section, and further including a tongue extending laterally from an outer side area of said stem and slidingly insertable into said slot section; and a frangible membrane connecting said stem to said base so that said key is axially aligned with said opening wherein said frangible membrane is broken when said stem is inserted into said opening, said key being initially inserted into said opening so that said noncircular section nonrotatably receives said stem and maintains said tongue in axial registration with said slot section whereby said end strands are initially clamped between said tongue and said base, and upon further insertion of said stem said slot section receives said tongue so that said end strands are formed into U-shaped loops and are clamped therein with said base and said key being mutually interlocked.

3. A string fastener made of a molded plastic material and having two detachable and mutually interlocking parts for securing the end strands of a string, said string fastener comprising: a base; an opening extending through said base having a noncircular section and a slot section; a key including a stem slidingly insertable into said noncircular section, and further including a tongue extending laterally from an outer side area of said stem and slidingly insertable into said slot section; a plurality of lugs extending laterally from said stem and yieldably insertable through said noncircular section when said stem is inserted therein; and a frangible membrane connecting said stem to said base so that said key is axially aligned with said opening wherein said frangible membrane is broken when said stem is inserted into said opening, said key being initially inserted into said opening so that said noncircular section nonrotatably receives said stem and maintains said tongue in axial registration with said slot section whereby said end strands are initially clamped between said tongue and said base, and upon further insertion of said key into said opening said tongue clamps said end strands along said slot section and said lugs are inserted through said base to prevent axial removal of said key from said opening.

4. A string fastener made of a molded plastic material having two detachable and mutually interlocking parts for securing the end strands of a lacing string threaded to the winding end turns of a dynamoelectric machine, said string fastener comprising: a rectangular base having parallel top and bottom surfaces; an elongated opening extending through said base, said opening having an arcuate sidewall defining a noncircular section and a pair of parallel sidewalls defining a slot section coextensive with said noncircular section; a key including a stem having straight sides and a cross-sectional shape corresponding to said noncircular section for nonrotational insertion therein; a pair of lugs extending from the sides of said stem intermediate the ends thereof so as to be yieldably insertable through said opening and overlapping said bottom surface of said base; a frangible membrane connecting an inner end of said stem to said top surface of said base in axially aligned relationship with said noncircular section and breakable upon insertion of said key therein; and said key further including a tongue extending laterally from an outer end of said stem in axial alignment with said slot section and having a cross-sectional shape corresponding to said slot section, said tongue being initially insertable into said slot section to clamp said end strands between said tongue and said base, and upon further insertion clamping said end strands along said pair of parallel sidewalls of said slot section.

* * * * *